United States Patent Office 3,334,941
Patented Aug. 8, 1967

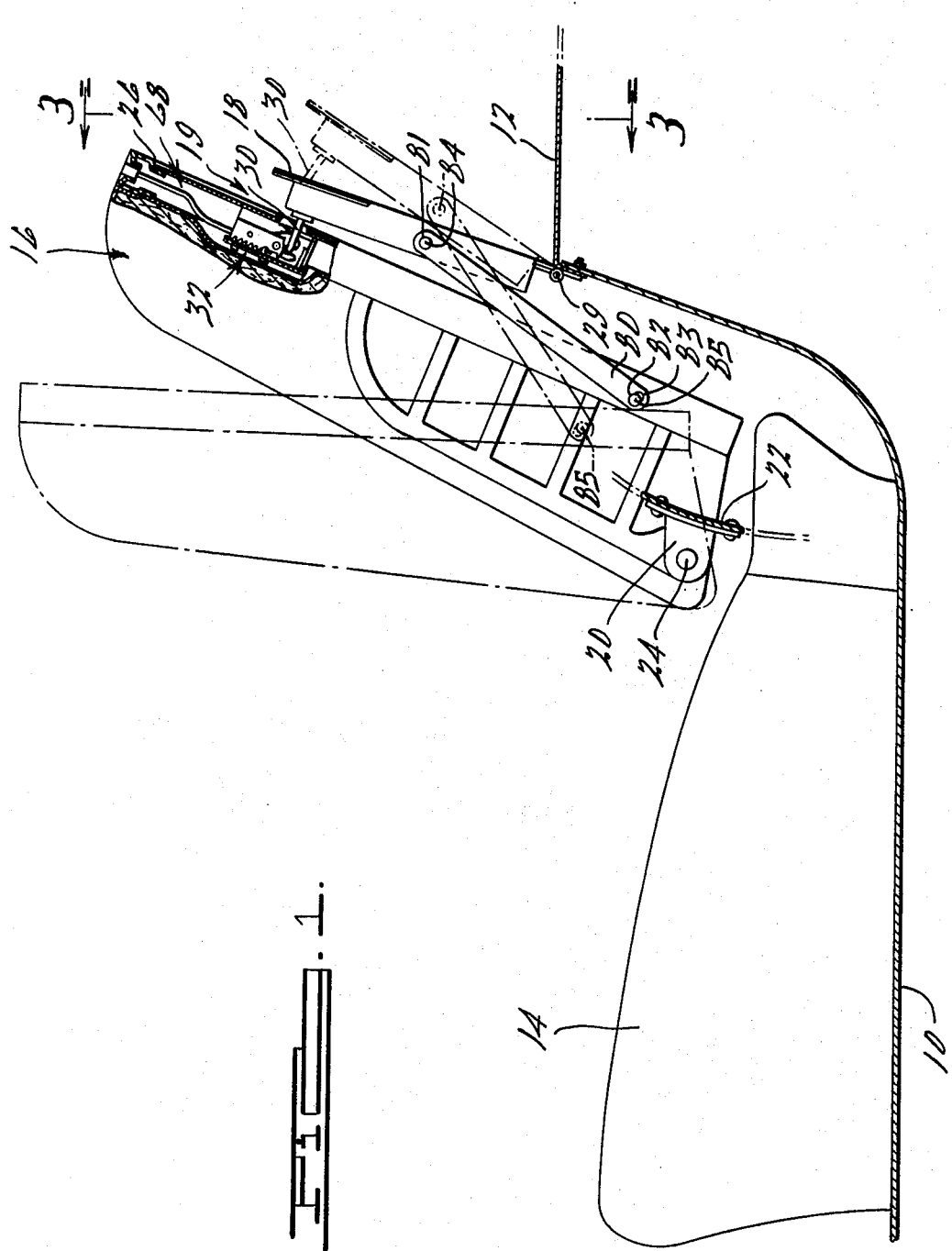

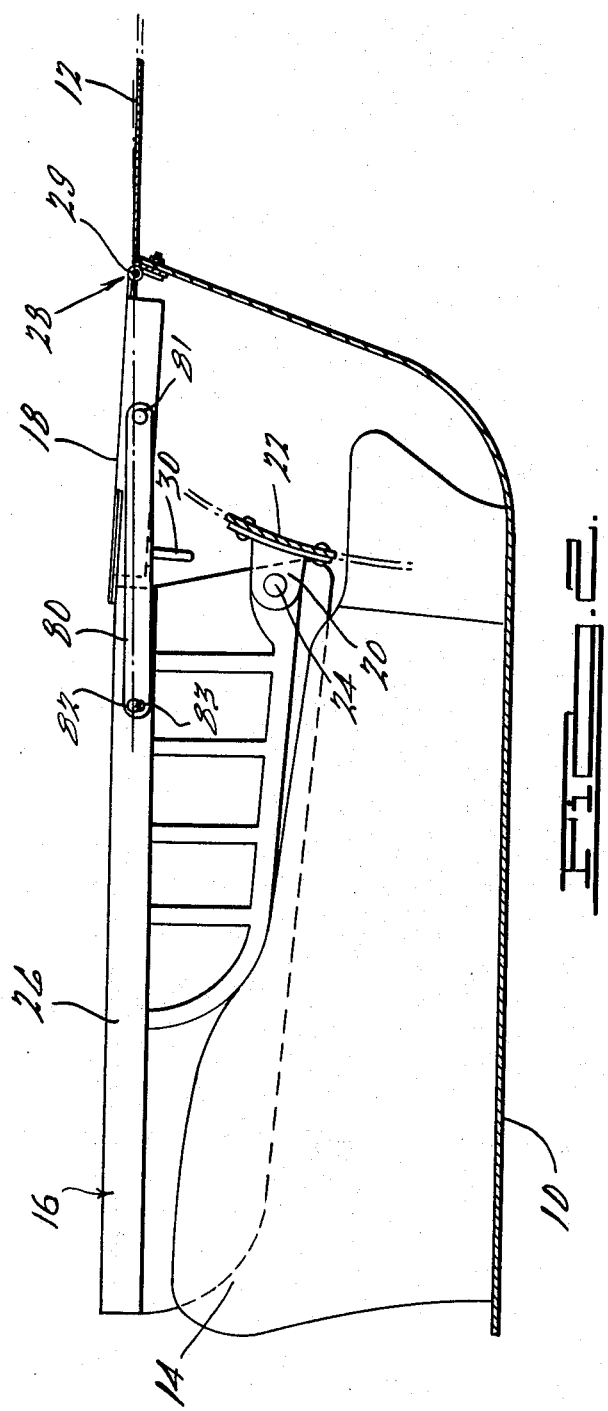

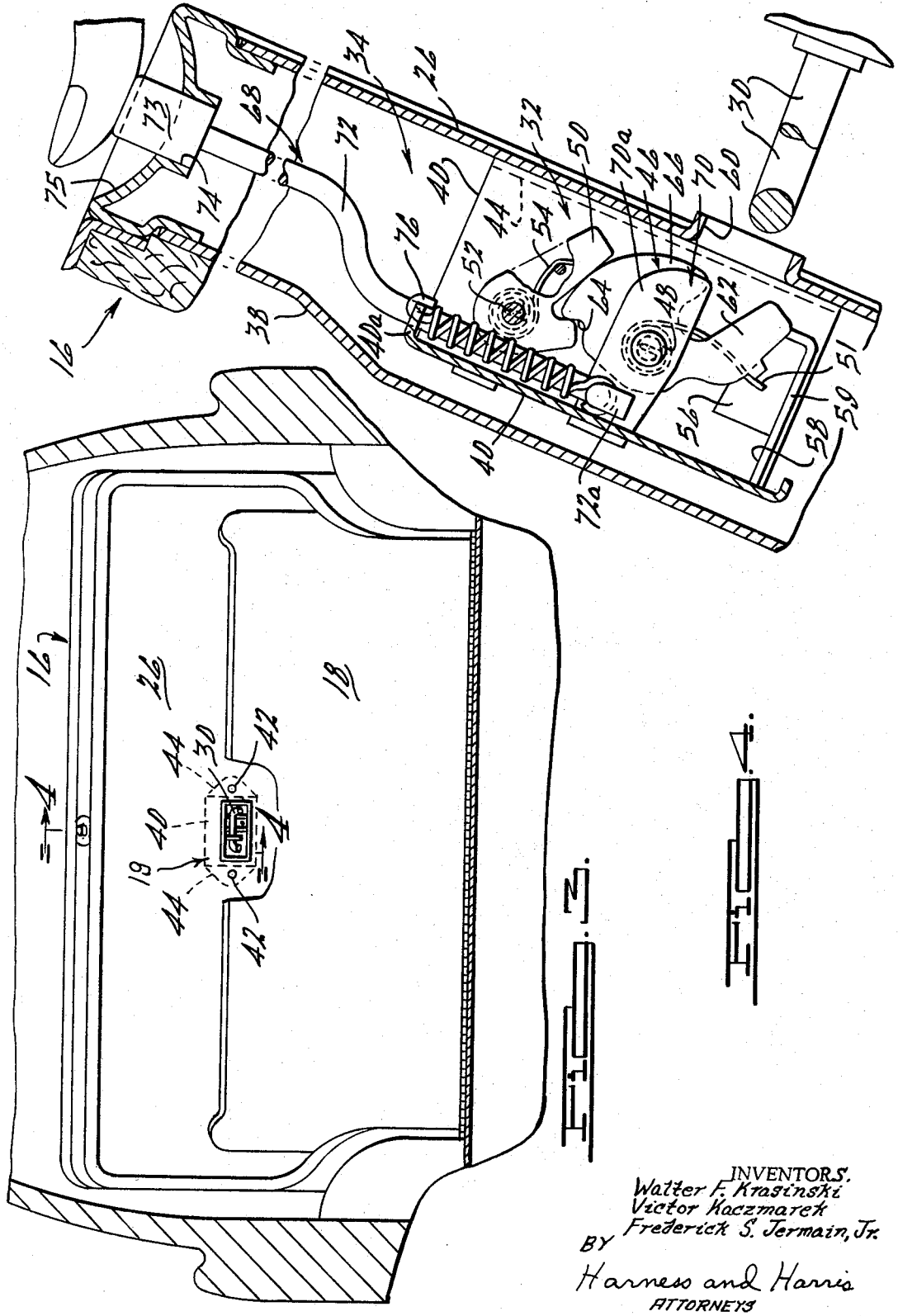

---

3,334,941
FOLDING SEAT ASSEMBLY
Walter F. Krasinski and Victor Kaczmarek, Detroit, and Frederick S. Jermain, Jr., Roseville, Mich., assignors to Chrysler Corporation, Highland Park, Mich., a corporation of Delaware
Filed June 8, 1965, Ser. No. 462,269
15 Claims. (Cl. 296—66)

This invention relates to vehicle seats and more particularly to a folding seat assembly for use with a multi-purpose vehicle body.

The seat assembly of the invention is intended primarily for use in multi-purpose vehicle bodies such, for example, as station wagon bodies. The seating arrangement for bodies of this type generally includes a driver's seat and a foldable second seat located rearwardly of the driver's seat and movable between a normal passenger-carrying position and a folded load-carrying position. The portion of the vehicle body floor rearwardly of the second seat is normally elevated above the level of the floor portion supporting the seats so as to provide clearance for the rear wheel and axle structure of the vehicle. With the second seat in folded position, the back of this seat is disposed above the seat bottom with the back surface of the seat back located substantially flush with the elevated rear floor portion.

A typical folding second seat assembly also generally includes a "flipper" or floor panel swingably mounted behind the seat back adjacent the forward edge of the elevated rear floor portion. The floor panel is usually arranged to assume a generally upstanding position behind the seat back when the latter is in its upright or seating position and to pivotally move into and fill the space between the rear edge of the seat back and the forward edge of the elevated rear floor portion as the seat back is moved into its horizontal or cargo-carrying position. In this position, the back surface of the seat back, the floor panel, and the elevated rear floor portion line up in serial flush relation to form a flat, continuous cargo floor. A typical folding second seat assembly also generally includes left and right latch means on the seat back adjacent the opposite side edges thereof for coaction with complementary latch means on the wheel housings to releasably secure the seat back in its upright or seating position.

Folding second seat assemblies as described above, while generally satisfactory, have exhibited some undesirable behavior characteristics. Specifically, it has often been difficult to firmly engage the latching mechanisms on both wheel housings with a single rearward movement of the seat back. For example, the right latching mechanism may engage but not the left. When this occurs, the right latch must be released and the seat back must be retracted toward its down position and then moved rearwardly again in an attempt to simultaneously engage both latches. Often several such cycles are required before simultaneous engagement of both latches is achieved.

Similarly, release of the seat back for movement to its folded position has often required separate actuation of the release devices associated with the separate latching mechanisms. Even where the left and right release devices have been coupled or ganged together so that only one of the release devices need theoretically be grasped, release of the remote latching mechanism has been difficult to consistently achieve.

Further, it has been found that the above described latching arrangement has been susceptible to accidental release as, for example, when the upstanding floor panel is struck by a relatively heavy object sliding forward along the cargo floor during a sudden deceleration.

Further, the free or upper edge of the floor panel has tended to rattle against the rear face of the upstanding seat back, especially during movement of the vehicle over rough surfaces.

Also, the prior art constructions tend to give the entire seat assembly a cluttered appearance since, with the back in its folded position, the left and right latching elements on the seat back are fully exposed at the rear surface of the seat back and the coacting latching elements on the wheel housings are similarly fully exposed.

Further, the exposed latching elements on the seat back and wheel housings tend to interfere with loading; they also present a safety hazard by virtue of their protruding, and sometimes sharp, edges.

Accordingly, it is an object of the present invention to provide an improved folding seat assembly for a multi-purpose vehicle body.

It is a specific object to provide such a seat assembly which will be relatively easy to firmly latch in the upstanding or seating position.

Another object is to provide such a seat assembly which will be relatively easy to unlatch for movement toward its folded position.

Yet another object is to provide such a seat assembly which will be extremely resistant to accidental release and which, in particular, will be extremely resistant to accidental release as a result of impact thereagainst by sliding cargo during sudden deceleration of the vehicle.

Still another object is to provide such a seat assembly which will resist rattling between the flipper panel and seat back.

Another object is to provide such a seat assembly which, particularly when in its folded cargo-carrying position, will present a smooth, uncluttered appearance.

A related object is to provide such a seat which, particularly when in its folded or cargo-carrying position, will be relatively free of protrusions or exposed edges in the cargo area, whereby to facilitate loading of the vehicle and contribute to its overall safety.

According to a primary feature of the invention, the latch means for coaction with the latch means on the seat back, rather than being carried on the wheel housings, are carried on the floor panel adjacent the free or upper edge of the latter. The respective latch means on the seat back and floor panel move into latching engagement as the seat back reaches its upright or seating position, whereby the floor panel, through its attachment to the elevated rear portion of the cargo floor, holds the seat in its upright position. The point of latching attachment of the floor panel to the seat back, the pivotal axis of the seat back on the body floor, and the pivotal axis of the floor panel on the elevated rear floor portion thus form the three points or corners of a triangle, the sides of which are respectively formed by the seat back, the floor panel and the body floor.

In order for the seat to move forwardly toward its folded position, the aforedescribed triangle must be collapsed by breaking the latching engagement of the floor panel to the seat back. However, since the force exerted on the latching elements in response to impact against the floor panel is in a direction generally normal to the un-latching direction of the latch elements, the tendency is for such force to jam up the latching elements rather than release them. The second seat assembly of the invention is thus extremely resistant to accidental release as a result of impact of sliding cargo against the floor panel. Further, the firm latching connection between the floor panel and seat back serves to minimize rattling of the floor panel against the seat back.

According to another feature of the invention, the seat latching assembly comprises a single latch element located substantially centrally of the seat back and a single latch element located substantially centrally of the floor panel. This single, central latch assembly replaces the left and right latch assemblies of prior constructions so that the possibility of the seat assuming only a partially latched condition upon rearward movement thereof is eliminated.

According to yet another feature of the invention, the release mechanism for the single central latch assembly as above described comprises a button or similar device disposed centrally on the seat back adjacent the top edge of the latter so as to be readily accessible from either side of the vehicle. With this arrangement, release of the seat back is accomplished with a single, positive movement and the possibility of the seat becoming only partially unlatched is eliminated.

The described arrangement also results in the coacting latching elements being completely out of sight and inaccessible beneath the floor panel when the seat back is in its upright position. Also, with the seat back in folded position, the wheel housings as well as the left and right edges of the seat back are completely free of latching elements. The latching element on the floor panel is disposed out of sight beneath that panel. The central latch element on the seat back is exposed but, as will appear hereinafter, may readily be sunk flush with the seat back. The described folding seat assembly thus provides a simple uncluttered design which presents relatively few sharp or protruding edges in either the seating or the cargo-carrying position. It is thus superior to prior constructions from aesthetic, convenience, and safety considerations.

According to another important feature of the invention, a link pivotally interconnects the seat back and the floor panel so that movement of the seat back between its cargo carrying and seating positions automatically and positively moves the floor panel between its corresponding positions. The link is arranged so that as the seat back and panel approach their upright or seating positions, the pivotal axis of the link to the seat back passes over center with respect to the pivotal axis of the link to the floor panel and the pivotal axis of the seat back to the vehicle floor.

This arrangement provides two advantages. First, it results in the floor panel reversing its direction of pivotal movement as the seat back approaches very near its seating position so that the floor panel is actually moving toward the seat back as the latter reaches its seating position. This ensures that the latching elements on the seat back and the flipper panel will move firmly and crisply into latching engagement. The second advantage of this arrangement is that, since the line of action of the link passes below the pivotal axis of the seat back with the latter in its upright position, a force exerted against the floor panel in a direction to move it toward the seat back generates, through the floor panel and link, a counterforce pressing the seat back against the floor panel. Sliding cargo impacting against the floor panel thus results in the latch elements on the seat back and floor panel being pressed together, whereby to substantially reduce the possibility of latch failure.

These and other objects, features, and advantages of the invention will be apparent from the following detailed description of a preferred embodiment of the invention and from the accompanying drawings, wherein:

FIG. 1 is a side view of a folding seat assembly according to the invention, shown in upright or seating position;

FIG. 2 is a view similar to FIG. 1 showing the seat in folded or cargo-carrying position;

FIG. 3 is a rear view of the folding seat assembly of FIGS. 1 and 2; and

FIG. 4 is a sectional fragmentary view, on an enlarged scale, taken on lines 4—4 of FIG. 3.

Referring first to FIGS. 1 and 2, the folding seat assembly of the invention is therein shown installed in a multi-purpose vehicle body of the type including a vehicle floor having a relatively depressed portion 10 supporting the seat assembly and a cargo-carrying portion 12 elevated above the level of portion 10 to provide clearance for the wheel and axle structure (not shown) of the vehicle.

The folding seat assembly, broadly considered, comprises a seat bottom 14, a seat back 16, a floor panel 18, and latch means, shown generally at 19, to releasably secure the panel 18 and seat back 16 together.

The seat bottom 14 is stationary. The seat back 16 is mounted by brackets 20 projecting from wheel housings 22 for pivotal movement about an axis 24 between a generally upright seating position and a generally horizontal cargo-carrying position.

In its upright seating position, as seen in solid lines in FIG. 1, seat back 16 extends upwardly above the level of elevated floor portion 12 and is spaced somewhat forwardly of the forward edge of that floor portion.

In its cargo-carrying position, as seen in FIG. 2, the seat back extends forwardly to overlie the seat bottom. In this position, its back surface 26 is substantially flush with the surface of elevated floor portion 12 but the rear edge of the seat back is spaced forwardly from the forward edge of floor portion 12.

The floor panel 18 is generally rectangular and is mounted at its rearward edge (as viewed in FIG. 2) by a piano hinge assembly 28 for pivotal movement about an axis 29 lying along the forward edge of elevated floor portion 12.

Hinge assembly 28 mounts panel 18 for movement between a generally upright seating position and a generally horizontal cargo-carrying position.

In its upright position, as seen in solid lines in FIG. 1, panel 18 extends upwardly above floor portion 12 immediately behind the upright seat back 16.

In its cargo-carrying position, as seen in FIG. 2, panel 18 spans the space between the rearward edge of seat back 16 and the forward edge of elevated floor portion 12 and lies substantially flush with each to form therewith a flat, continuous cargo floor.

The latch means 19 includes a striker 30 projecting from the undersurface of panel 18 adjacent its forward (as viewed in FIG. 2) edge and a bolt assembly 32 at back surface 26 of seat back 16.

Strikers 30 is of U form, as best seen in FIGS. 3 and 4.

With continued reference to FIGS. 3 and 4, bolt assembly 32 is mounted within the seat back in a cavity 34 defined between the outer sheet metal skin forming back surface 26 of the seat back and an inner sheet metal skin 38. Bolt assembly 32 includes a U-shaped bracket 40 secured to the inner face of the outer skin 36 by fasteners 42 engaging bracket ears 44, a rotary bolt 46 mounted on pin 48 carried by bracket 40 and continuously urged in a counterclockwise direction by a coil spring 51, a detent 50 pivotally mounted on a pin 52 carried by bracket 40 and continuously urged against bolt 46 by a coil spring 54, and a wedge block 56 guided for sliding movement along a surface 58 provided by an arm 59 projecting from bracket 40.

As will be apparent from FIG. 4, with seat back 16 in its upright position, striker 30 may enter cavity 34 through an opening 60 formed in outer seat back skin 36 and strike throwout arm portion 62 of bolt 46 to rotate the latter in a clockwise direction and allow detent 50 to drop into latching engagement with a tooth 64 formed on bolt 46. In this latched position, latch arm portion 66 of bolt 46 traps striker 30 to releasably secure panel 18 to seat back 16. The floor panel 18 thus holds seat back 16 in its upright position with the point of latching attachment of the floor panel to the seat back, the seat back pivot axis 24, and the floor panel pivot axis 29 defining the three corners of a triangle which must be collapsed in order for the seat to move forwardly toward its cargo-carrying position. In order to collapse this triangle, the latching engagement of the floor panel to the seat back must be broken.

However, as panel 18 and seat back 16 attempt to pivot simultaneously forwardly in response to impact of sliding cargo against the floor panel, striker 30 is pressed downwardly against wedge block 56 so that the latch tends to tighten or jam rather than release. The second seat assembly is thus extremely resistant to accidental release as a result of impact of sliding cargo against the floor panel. Also, the positive connection between seat back 16 and panel 18 provided by latch means 19 serves to reduce rattling of the floor panel against the seat back.

Further, since the seat assembly of the invention utilizes only one latch assembly, the possibility of the seat back assuming only a partially latched condition upon rearward movement thereof is eliminated.

Latch means 19 also includes a release assembly 68. As best seen in FIG. 4, assembly 68 includes a cam trip lever 70 pivotally mounted on pin 48, a rod 72 extending vertically within seat back 16 and passing at its lower end through a hole in lever 70, a push button 73 secured to the upper end of rod 72 and slidably mounted in a bore 74 formed at the bottom of a concave recess 75 in the top edge of the seat back, and a return spring 76 tensioned between a flange portion 40a of bracket 40 and a hook portion 72a formed at the lower end of rod 72.

With bolt 46 in its latched position trapping striker 30, rod 72 may be moved downwardly by depression of button 74. As rod 72 moves downwardly, it rotates cam trip lever 70 counterclockwise so that the cam end 70a of lever 70 moves upwardly to move detent 50 upwardly out of engagement with tooth 64, whereby bolt 46 is released to rotate under the urging of spring 51 and eject striker 30. Upon release of button 74, spring 76 returns rod 72 and button 74 to their raised positions as seen in FIG. 4. Since push button 74, as seen in FIG. 3, is located centrally between the side edges of seat back 16, it may be reached with equal ease from either side of the automobile; and since there is only one central release device controlling one central latching mechanism, the possibility of the seat back becoming only partially unlatched is eliminated.

Further, with the seat back and floor panel in their upright positions, the latching elements are completely out of sight beneath the floor panel. With the seat back and floor panel in their cargo-carrying positions, the striker is hidden beneath the floor panel and the bolt assembly 32 is hidden within seat back cavity 34. The cargo area thus presents a clean appearance, uncluttered as in prior constructions by latch elements protruding from the wheel housings or from the left and right edges of the back surface of the seat back.

Referring again to FIGS. 1 and 2, the folding seat of the invention also includes a follower or guide link 80. Link 80 is pivotally connected at its one end by a pin 81 to a side edge surface of floor panel 18. The other end of link 80 is pivotally connected to the corresponding side edge surface of seat back 16 by a pin 82 received in a slot 83 in link 80. Thus, movement of the seat back between its cargo-carrying and upright seating positions automatically and positively moves the floor panel between its corresponding positions. The locations of the link-to-panel axis 84 and the link-to-seat back axis 85 are chosen relative to the seat back-to-body axis 24 and panel-to-floor axis 29 so that as the seat back and panel approach their upright or seating positions, the link-to-seat back axis 85 passes over center with respect to axes 24 and 84. The positions of the seat back, floor panel and link as axis 85 reaches its centered position with respect to axes 24 and 84 are shown in dotted lines in FIG. 1. Up until this point, panel 18 has moved clockwise about axis 29 from its cargo-carrying position as seat back 16 is raised. As axis 85 passes over center, however, panel 18 stops and commences to move counterclockwise about axis 29. Thus, as the seat back and panel reach their solid line positions, they are moving toward each other to ensure that striker 30 and bolt 46 engage positively to quickly and crisply move bolt 46 to its latched position. Although only one link 80 is shown and described, it will be understood that there are actually two such links, one pivoted to each side edge of the seat back and to the corresponding side edge of the panel.

With the seat back and panel latched in their upright positions, cargo sliding along elevated floor portion 12, as for example during sudden deceleration of the vehicle, will strike the panel 18 and tend to pivot it clockwise about axis 29. However, as panel 18 tries to pivot about axis 29, it tends to drive link 80 forwardly; and since axis 85 is in an over center position relative to axes 24 and 84 so that the line of action of link 80 passes below axis 24, forward movement of link 80 tends to pivot seat back 16 clockwise about axis 24. The latch elements on the seat back and panel are thus driven together. The greater the impact force against panel 18, the greater the counterforce generated as afore-described through link 80. Since the latch elements are thus placed in compression in response to cargo impact, rather than in tension as in prior constructions, the possibility of latch failure is substantially reduced.

While a preferred embodiment of the invention has been illustrated and described in detail, it is to be understood that various changes may be made in the disclosed embodiment without departing from the scope or spirit of the invention as defined in the appended claims. For example, although a specific form of latch has been disclosed for releasably securing the seat back to the floor panel, the invention contemplates the use of other and different latch forms.

We claim:

1. In a motor vehicle body of the type including a floor having an elevated cargo-carrying portion:
 (A) a vehicle seat comprising
  (1) a seat bottom and
  (2) a seat back;
 (B) means pivotally mounting said seat back on said body for pivotal movement between
  (1) a generally upright seating position wherein said seat back extends upwardly above said elevated floor portion adjacent thereto and
  (2) a generally horizontal cargo-carrying position wherein said seat back extends forwardly to overlie said seat bottom and is substantially flush with said elevated floor portion but spaced forwardly therefrom;
 (C) a floor panel pivoted adjacent its rearward edge to said body on an axis adjacent said elevated floor portion and movable between
  (1) a generally upright seating position wherein it extends upwardly above said floor portion adjacent said seat back and
  (2) a generally horizontal cargo-carrying position wherein said panel spans the space between said elevated floor portion and said seat back and is substantially flush with each to form therewith a flat, continuous cargo floor; and
 (D) coacting latch means on said seat back and on said panel for releasably securing said panel to said seat back with said panel and said seat back in their upright seating positions.

2. In a motor vehicle body of the type including a floor having an elevated cargo-carrying portion:
 (A) a vehicle seat comprising
  (1) a seat bottom and
  (2) a seat back;
 (B) means pivotally mounting said seat back on said body for pivotal movement between
  (1) a generally upright seating position wherein said seat back extends upwardly above said elevated floor portion adjacent thereto and
  (2) a generally horizontal cargo-carrying position wherein said seat back extends forwardly to overlie said seat bottom and is substantially flush with said elevated floor portion but spaced forwardly therefrom.

(C) a floor panel pivoted adjacent its rearward edge to said body on an axis adjacent said elevated floor portion and movable between
 (1) a generally upright seating position wherein it extends upwardly above said floor portion adjacent said seat back and
 (2) a generally horizontal cargo-carrying position wherein said panel spans the space between said elevated floor portion and said seat back and is substantially flush with each to form therewith a flat, continuous cargo floor;

(D) latch means on said seat back; and (E) latch means on said panel adjacent its forward edge and coacting with said latch means on said seat back in the upright seating position of the latter to releasably secure said panel and seat back together.

3. In a motor vehicle body of the type including a floor having an elevated cargo-carrying portion:

(A) a vehicle seat comprising
 (1) a seat bottom and
 (2) a seat back;

(B) means pivotally mounting said seat back on said body for pivotal movement between
 (1) a generally upright seating position wherein said seat back extends upwardly above said elevated floor portion adjacent thereto and
 (2) a generally horizontal cargo-carrying position wherein said seat back extends forwardly to overlie said seat bottom and is substantially flush with said elevated floor portion but spaced horizontally therefrom;

(C) a generally rectangular floor panel pivoted adjacent its rearward edge to said body on an axis adjacent said elevated floor portion and movable between
 (1) a generally upright seating position wherein it extends upwardly above said floor portion adjacent said seat back and
 (2) a generally horizontal cargo-carrying position wherein said panel spans the space between said elevated floor portion and said seat back and is substantially flush with each to form therewith a flat, continuous cargo floor;

(D) a single latch element positioned on said panel
 (1) adjacent the forward edge thereof and
 (2) substantially centrally of the side edges thereof; and (E) a single latch element on the back surface of said seat back positioned to coact with said latch element on said panel in the upright seating position of said seat back to releasably secure said panel and seat back together.

4. In a motor vehicle body of the type including a floor having an elevated cargo-carrying portion:

(A) a vehicle seat comprising
 (1) a seat bottom and
 (2) a seat back;

(B) means pivotally mounting said seat back on said body for pivotal movement between
 (1) a generally upright seating position wherein said seat back extends upwardly above said elevated floor portion adjacent thereto and
 (2) a generally horizontal cargo-carrying position wherein said seat back extends forwardly to overlie said seat bottom and is substantially flush with said elevated floor portion but spaced horizontally therefrom;

(C) a generally rectangular floor panel pivoted adjacent its rearward edge to said body on an axis adjacent said elevated floor portion and movable between
 (1) a generally upright seating position wherein it extends upwardly above said floor portion adjacent said seat back and
 (2) a generally horizontal cargo-carrying position wherein said panel spans the space between said elevated floor portion and said seat back and is substantially flush with each to form therewith a flat, continuous cargo floor;

(D) latch means on said seat back;

(E) latch means on said panel adjacent its forward edge and coacting with said latch means on said seat back in the upright seating position of the latter to releasably secure said panel and seat back together; and (F) release means, including a manually operable member positioned on said seat back adjacent the top edge thereof, operative in response to actuation of said manually operable member to release said latch elements to allow movement of said seat back and panel to their cargo-carrying positions.

5. In a motor vehicle body of the type including a floor having an elevated cargo-carrying portion:

(A) a vehicle seat comprising
 (1) a seat bottom and
 (2) a seat back;

(B) means pivotally mounting said seat back on said body for pivotal movement between
 (1) a generally upright seating position wherein said seat back extends upwardly above said elevated floor portion adjacent thereto and
 (2) a generally horizontal cargo-carrying position wherein said seat back extends forwardly to overlie said seat bottom and substantially flush with said elevated floor portion but spaced horizontally therefrom;

(C) a generally rectangular floor panel pivoted adjacent its rearward edge to said body on an axis adjacent said elevated floor portion and movable between
 (1) a generally upright seating position wherein it extends upwardly above said floor portion adjacent said seat back and
 (2) a generally horizontal cargo-carrying position wherein said panel spans the space between said elevated floor portion and said seat back and is substantially flush with each to form therewith a flat, continuous cargo floor;

(D) a single latch element positioned on said panel
 (1) adjacent the forward edge thereof and
 (2) substantially centrally of the side edges thereof;

(E) a single latch element on the back surface of said seat back positioned to coact with said latch element on said panel in the upright seating position of said seat back to releasably secure said panel and seat back together; and (F) release means, including a manually operable member positioned on said seat back adjacent the top edge thereof and substantially centrally of the side edges thereof, operative in response to actuation by an operator of said manually operably member to release said latch elements to allow movement of said seat back and panel to their cargo-carrying positions.

6. In a motor vehicle body of the type including a floor having an elevated cargo-carrying portion:

(A) a vehicle seat comprising
 (1) a seat bottom and
 (2) a seat back;

(B) means pivotally mounting said seat back on said body for pivotal movement between
 (1) a generally upright seating position wherein said seat back extends upwardly above said elevated floor portion adjacent thereto and
 (2) a generally horizontal cargo-carrying position wherein said seat back extends forwardly to overlie said seat bottom and is substantially flush with said elevated floor portion but spaced horizontally therefrom;

(C) a generally rectangular floor panel pivoted adjacent its rearward edge to said body on an axis adjacent said elevated floor portion and movable between
    (1) a generally upright seating position wherein it extends upwardly above said floor portion adjacent said seat back and
    (2) a generally horizontal cargo-carrying position wherein said panel spans the space between said elevated floor portion and said seat back and is substantially flush with each to form therewith a flat, continuous cargo floor;

(D) means forming a cavity within said seat back opening at the back surface thereof;

(E) a bolt mounted within said cavity for movement between latching and unlatching positions; and (F) a striker projecting from the under surface of said panel and positioned so that, with said seat back in its upright seating position, the striker may enter said cavity through the aforesaid opening of the latter in said back surface and strike said bolt, whereby to move said bolt to its latching position wherein it traps said striker to releasably secure said panel and seat back together.

7. A vehicle seat assembly according to claim 6 wherein
(A) said striker is positioned on said panel adjacent the forward edge thereof and substantially centrally of the side edges thereof; and
(B) said opening is provided centrally on said seat back in alignment with said striker.

8. In a motor vehicle body of the type including a floor having an elevated cargo-carrying portion:
(A) a vehicle seat comprising
    (1) a seat bottom and
    (2) a seat back;
(B) means pivotally mounting said seat back on said body for pivotal movement between
    (1) a generally upright seating position wherein said seat back extends upwardly above said elevated floor portion adjacent thereto and
    (2) a generally horizontal cargo-carrying position wherein said seat back extends forwardly to overlie said seat bottom and is substantially flush with said elevated floor portion but spaced horizontally therefrom;
(C) a generally rectangular floor panel pivoted adjacent its rearward edge to said body on an axis adjacent said elevated floor portion and movable between
    (1) a generally upright seating position wherein it extends upwardly above said floor portion adjacent said seat back and
    (2) a generally horizontal cargo-carrying position wherein said panel spans the space between said elevated floor portion and said seat back and is substantially flush with each to form therewith a flat, continuous cargo floor;
(D) means forming a cavity in the back surface of said seat back substantially centrally of the side edges thereof;
(E) a bolt mounted within said cavity for movement between latching and unlatching positions;
(F) a striker projecting from the under surface of said panel at a location thereon adjacent the forward edge thereof and substantially centrally of the side edges thereof,
    (1) said striker being positioned so that it may enter said cavity and strike said bolt with said seat back in its upright seating position whereby to move said bolt to its latching position wherein it traps said striker to releasably secure said panel and seat back together; and
(G) release means, including a rod assembly extending vertically within said seat back and projecting at its upper end through the top edge of said seat back to present a push button on said top edge disposed substantially centrally of the side edges of said seat back, operative in response to depression of said push button to release said bolt for movement to its unlatching position, whereby to allow said seat back and panel to be moved to their cargo-carrying positions.

9. In a motor vehicle body of the type including a floor having an elevated cargo-carrying portion:
(A) a vehicle seat comprising
    (1) a seat bottom and
    (2) a seat back;
(B) means pivotally mounting said seat back on said body for pivotal movement between
    (1) a generally upright seating position wherein said seat back extends upwardly above said elevated floor portion adjacent thereto and
    (2) a generally horizontal cargo-carrying position wherein said seat back extends forwardly to overlie said seat bottom and is substantially flush with said elevated floor portion but spaced horizontally therefrom;
(C) a floor panel pivoted adjacent its rearward edge to said body on an axis adjacent said elevated floor portion and movable between
    (1) a generally upright seating position wherein it extends upwardly above said floor portion adjacent said seat back and
    (2) a generally horizontal cargo-carrying position wherein said panel spans the space between said elevated floor portion and said seat back and is substantially flush with each to form therewith a flat, continuous cargo floor;
(D) latch means on said seat back;
(E) latch means on said panel adjacent its forward edge and coacting with said latch means on said seat back in the upright seating position of the latter to releasably secure said panel and seat back together; and
(F) a link pivotally connected adjacent its opposite ends to said seat back and to said panel, respectively.

10. In a motor vehicle body of the type including a floor having an elevated cargo-carrying portion:
(A) a vehicle seating comprising
    (1) a seat bottom and
    (2) a seat back;
(B) means pivotally mounting said seat back on said body for pivotal movement between
    (1) a generally upright seating position wherein said seat back extends upwardly above said elevated floor portion adjacent thereto and
    (2) a generally horizontal cargo-carrying position wherein said seat back overlies said seat bottom and is substantially flush with said elevated floor portion but spaced horizontally therefrom;
(C) a floor panel pivoted adjacent one end to said body on an axis adjacent said elevated floor portion and movable between
    (1) a generally upright seating position wherein it extends upwardly above said floor portion adjacent said seat back and
    (2) a generally horizontal cargo-carrying position wherein said panel spans the space between said elevated floor portion and said seat back and is substantially flush with each to form therewith a flat, continuous cargo floor;
(D) latch means on said seat back;
(E) latch means on said panel adjacent the other end of the latter and coacting with latch means on said seat back in the upright seating position of the latter to releasably secure said panel and seat back together; and
(F) a link
    (1) pivotally connected adjacent its opposite ends to said seat back and to said panel, respectively, and (2) assuming, with said seat back and panel in their upright seating positions, a position wherein the angle between said panel and the plane containing the link-to-panel and link-to-seat back pivotal axes is lesser than the angle between the said panel and the plane containing the link-to-panel and seat back-to-body pivotal axes, whereby a force exerted against said panel in a direction to urge it against said seat back generates, through said panel and said link, a counterforce pressing said seat back against said panel.

11. In a motor vehicle body of the type including a floor having an elevated cargo-carrying portion:
(A) a vehicle seat comprising
 (1) a seat bottom and
 (2) a seat back;
(B) means pivotally mounting said seat back on said body for pivotal movement between
 (1) a generally upright seating position wherein said seat back extends upwardly above said elevated floor portion adjacent thereto and
 (2) a generally horizontal cargo-carrying position wherein said seat back overlies said seat bottom and is substantially flush with said elevated floor portion but spaced horizontally therefrom;
(C) a generally rectangular floor panel pivoted along its rearward edge to said body on an axis lying generally along the forward edge of said elevated floor portion and movable between
 (1) a generally upright seating position wherein it extends upwardly above said floor portion adjacent said seat back and
 (2) a generally horizontal cargo-carrying position wherein said panel spans the space between said elevated floor portion and said seat back and is substantially flush with each to form therewith a flat, continuous cargo floor;
(D) latch means on said seat back;
(E) latch means on said panel adjacent the forward edge of the latter and coacting with said latch means on said seat back in the upright seating position of the latter to releasably secure said panel and seat back together; and
(F) a link
 (1) pivotally connected
  (a) at one end to a side of said panel at a location therealong between its rearward and forward edges and
  (b) at its other end to the corresponding side edge surface of said seat and
 (2) assuming, with said seat back and panel in their upright seating positions, a position wherein the angle between said panel and the plane containing the link-to-panel and link-to-seat back pivotal axes is lesser than the angle between said panel and the plane containing the link-to-panel and seat back-to-body pivotal axes, whereby a force exerted against said panel in a direction to urge it against said seat back and seat link generates, through said panel and said link, a counterforce pressing said seat back against said panel.

12. In a motor vehicle body of the type including a floor having an elevated cargo-carrying portion:
(A) a vehicle seat comprising
 (1) a seat bottom and
 (2) a seat back;
(B) means pivotally mounting said seat back on said body for pivotal movement between
 (1) a generally upright seating position wherein said seat back extends upwardly above said elevated floor portion adjacent thereto and
 (2) a generally horizontal cargo-carrying position wherein said seat back overlies said seat bottom and is substantially flush with said elevated floor portion but spaced horizontally therefrom;
(C) a generally rectangular floor panel pivoted along its rearward edge to said body on an axis lying generally along the forward edge of said elevated floor portion and movable between
 (1) a generally upright seating position wherein it extends upwardly above said floor portion adjacent said seat back and
 (2) a generally horizontal cargo-carrying position wherein said panel spans the space between said elevated floor portion and said seat back and is substantially flush with each to form therewith a flat, continuous cargo floor;
(D) a single latch element positioned on said panel
 (1) adjacent the forward edge thereof and
 (2) substantially centrally of the side edges thereof;
(E) a single latch element on the back surface of said seat back positioned to coact with said latch element on said panel in the upright seating position of said seat back to releasably secure said panel and seat back together;
(F) a link
 (1) pivotally connected
  (a) at one end to a side surface of said panel at a location therealong between its rearward and forward edges, and
  (b) at its other end to the corresponding side edge surface of said seat back, and
 (2) assuming, with said seat back and panel in their upright seating positions, a position wherein the angle between said panel and the plane containing the link-to-panel and link-to-seat back pivotal axes is lesser than the angle between the said panel and the plane containing the link-to-panel and seat-to-body pivotal axes, whereby a force exerted against said panel in a direction to urge it against said seat back generates, through said panel and seat link, a counterforce pressing said seat back against said panel.

13. In a motor vehicle body of the type including a floor having an elevated cargo-carrying portion:
(A) a vehicle seat comprising
 (1) a seat bottom and
 (2) a seat back;
(B) means pivotally mounting said seat back on said body for pivotal movement between
 (1) a generally upright seating position wherein said seat back extends upwardly above said elevated floor portion adjacent thereto and
 (2) a generally horizontal cargo-carrying position wherein said seat back overlies said seat bottom and is substantially flush with said elevated floor portion but spaced horizontally therefrom;
(C) a generally rectangular floor panel pivoted along its rearward edge to said body on an axis lying generally along the forward edge of said elevated floor portion and movable between
 (1) a generally upright seating position wherein it extends upwardly above said floor portion adjacent said seat back and
 (2) a generally horizontal cargo-carrying position wherein said panel spans the space between said elevated floor portion and said seat back and is substantially flush with each to form therewith a flat, continuous cargo floor;

(D) a single latch element positioned on said panel
  (1) adjacent the forward edge thereof and
  (2) substantially centrally of the side edge thereof;
(E) a single latch element on the back surface of said said seat back positioned to coact with said latch element on said panel in the upright seating position of said seat back to releasably secure said panel and seat back together;
(F) a link
  (1) pivotally connected
    (a) at one end to a side edge surface of said panel at a location therealong between its rearward and forward edges and
    (b) at its other end to the corresponding side edge surface of said seat back, and
  (2) assuming, with said seat back and panel in their upright seating positions, a position wherein the angle between said panel and the plane containing the link-to-panel and link-to-seat back pivotal axes is lesser than the angle between said panel and the plane containing the link-to-panel and seat back-to-body pivotal axes, whereby a force exerted against said panel in a direction to urge it against said seat back generates, through said panel and seat link, a counterforce pressing said seat back against said panel; and
(G) release means, including a manually operable member positioned on said seat back adjacent the top edge thereof and substantially centrally of the side edges thereof, operative in response to actuation of said manually operable means to release said latch elements to allow movement of said seat back and panel to their cargo-carrying positions.

14. A vehicle seat assembly according to claim 12, wherein there are two links as aforesaid, one pivoted to each side edge of said seat back and to the corresponding side edge of said panel.

15. In a motor vehicle body of the type including a floor having an elevated cargo-carrying portion:
(A) a vehicle seat comprising
  (1) a seat bottom and
  (2) a seat back;
(B) means pivotally mounting said seat back on said body for pivotal movement between
  (1) a generally upright seating position wherein said seat back extends upwardly above said elevated floor portion adjacent thereto and
  (2) a generally horizontal cargo-carrying position wherein said seat back extends forwardly to overlie said seat bottom and is substantially flush with said elevated floor portion but spaced horizontally therefrom;
(C) a floor panel pivoted adjacent its rearward edge to said body on an axis adjacent said elevated floor portion and movable between
  (1) a generally upright seating position wherein it extends upwardly above said floor portion adjacent said seat back and
  (2) a generally horizontal cargo-carrying position wherein said panel spans the space between said elevated floor portion and said seat back and is substantially flush with each to form therewith a flat, continuous cargo floor;
(D) latch means on said seat back;
(E) latch means on said panel adjacent its forward edge and coacting with said latch means on said seat back in the upright seating position of the latter to releasably secure said panel and seat back together; and
(F) a link
  (1) pivotally connected adjacent its one end to said panel and
  (2) pivotally connected adjacent its other end to said seat back at a location on the latter such that as the seat back and panel approach their upright positions the link-to-seat back axis passes over center with respect to the seat back-to-body and link-to-panel axes, whereby the direction of pivotal movement of said flipper panel reverses as said seat back and flipper panel approach their seating positions so that said seat back and flipper panel are moving toward one another as they reach their seating positions to ensure crisp engagement of said latch means.

References Cited
UNITED STATES PATENTS

| | | | |
|---|---|---|---|
| 2,927,818 | 3/1960 | Ferrara | 296—66 |
| 2,949,331 | 8/1960 | Himka | 296—66 |
| 3,053,565 | 9/1962 | Farrow | 296—66 |
| 3,246,924 | 4/1966 | Krueger et al. | 296—66 |

BENJAMIN HERSH, *Primary Examiner.*

J. H. BRANNEN, *Assistant Examiner.*